Patented Nov. 8, 1932

1,886,683

UNITED STATES PATENT OFFICE

HERMAN C. HUEGLIN, OF CHICAGO, ILLINOIS, ASSIGNOR TO FEDERAL MERCHANDISE COMPANY, OF CHICAGO, ILLINOIS, A CORPORATION OF ILLINOIS

VENTILATING MEANS

Original application filed June 30, 1928, Serial No. 289,573. Divided and this application filed April 1, 1930. Serial No. 440,687.

This invention relates to ventilating means, and more particularly to a bracket for mounting the motor and fan of a ventilating means for domestic use.

It has become the practice in kitchens, and other similar rooms, to mount an exhaust fan in the upper part of the window so that the warm air, steam and odors from cooking may be exhausted from the room through the operation of the fan. In my copending application, Serial No. 289,573, filed June 30, 1928, I disclosed a ventilating means of this type. The present application, which is a division of said copending application, relates specifically to the mounting ring and bracket for encasing the motor and supporting the motor and fan in the panel structure.

Since the motor and fan project into the room of the residence, and since they are plainly visible when installed in the manner pointed out in my above mentioned copending application, it is imperative that the bracket for supporting the motor and fan be of pleasing appearance so that its installation will not detract from the beauty and harmony of the room. Furthermore, it is desirable that the device be as free as possible from sharp corners and cracks into which dust and dirt can collect so that it may be easily cleaned by the housewife.

To this end, I have provided a new and improved mounting for the motor and blade of an exhaust type fan, a mounting which particularly adapts it for use in ventilating panels that are to be inserted in windows of residences and other similar installations.

Now to acquaint those skilled in the art with the teachings of my invention, reference is made to the accompanying drawing in which a preferred embodiment of it is shown by way of example and in which:

Figure 2 is a cross-sectional view of the bracket taken through the mounting ring, one of the arms and the motor mounting cup.

Figure 1:
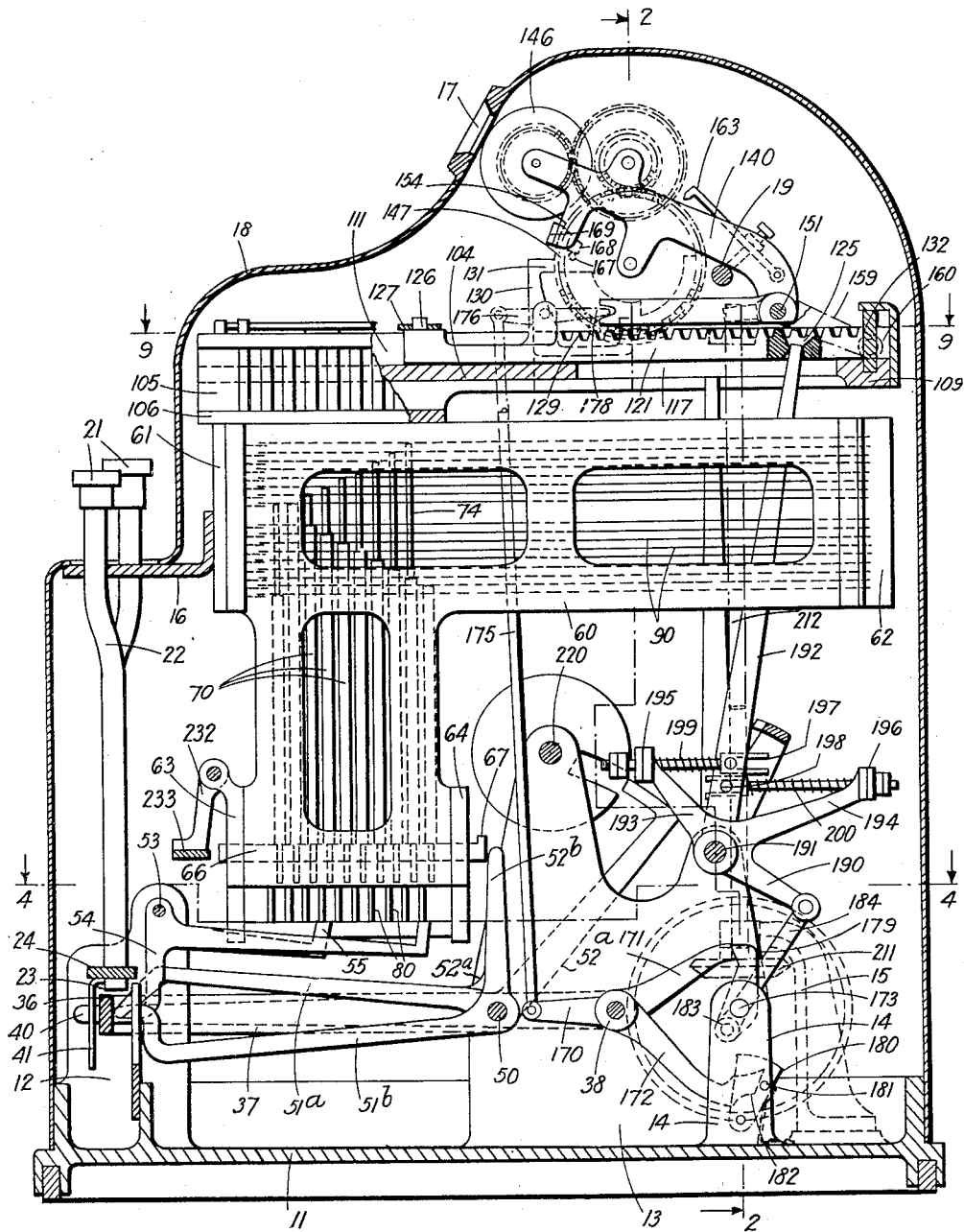
Figure 1 is a perspective view of the mounting bracket.

As will be seen from the drawing, the mounting ring 1 which is used to support the motor and fan in the panel or other similar device upon which the ventilating means is to be mounted, comprises a circular ring having a flange portion 2 projecting outwards adjacent one of its edges. This ring 2 is annular in shape and is provided with screw holes 3 through which screws or bolts may be projected to mount it upon a panel support. The mounting ring 1 also is provided with a cylindrical member formed integral with the annular flange screw and projecting beyond both surfaces of that flange. The one projection 4 serves as a mounting guide to position the bracket in an opening in the panel upon which it is to be mounted, and the other projection 5 serves as a guard for the fan blades of the ventilator.

The motor casing 6 is a cylindrical member closed at one end 7 and open at the opposite end 8 which open end is disposed adjacent the mounting ring 1. The motor housing 6 is attached to the mounting ring 1 by a plurality of arms 9 which rise out of a flange projection 5 of the mounting ring and terminate in the edge of the motor housing 6 adjacent its open end 8.

Preferably the mounting ring 1, its flange 2 and projections 4 and 5 and the motor housing bracket 9 and the housing 6 are all cast as an integral structure, and are preferably cast out of aluminum, an aluminum alloy, or brass, although if desired this structure might well be made out of an insulating material, such as a phenol condensation product within the teachings of my invention.

The electric motor indicated generally at 10 is encased in the casing 6, and held therein by a collar 11 which is a part of the motor and which is fitted into the counterbore 12 in the open end of the casing 6, where it is held by any preferred means such as the screws 13. As shown, the motor is of the squirrel cage induction type, and has but a single bearing 14, this showing being made by way of example as any preferred type of motor of suitable size may be encased in the casing 6 within the teachings of my invention. The laminæ 15 of the stator of the motor form an outer casing for the motor, the outside diameter of which is such that it will easily fit in the casing 6, these laminæ being rigidly attached to the cover plate 11 in any preferred manner.